(12) United States Patent
Vejmelka (10) Patent No.: US 10,437,986 B2
(45) Date of Patent: Oct. 8, 2019

(54) DISTANCE AND METHOD OF INDEXING SANDBOX LOGS FOR MAPPING PROGRAM BEHAVIOR

(71) Applicant: Avast Software s.r.o., Prague (CZ)

(72) Inventor: Martin Vejmelka, Prague (CZ)

(73) Assignees: AVAST SOFTWARE S.R.O., Prague (CZ); USTAV INFORMATIKY AV CR, V.V.I., Prague (CZ)

(*) Notice: Subject to any disclaimer, the term of this patent is extended or adjusted under 35 U.S.C. 154(b) by 284 days.

(21) Appl. No.: 15/374,670

(22) Filed: Dec. 9, 2016

(65) Prior Publication Data

US 2017/0169214 A1 Jun. 15, 2017

Related U.S. Application Data

(60) Provisional application No. 62/265,790, filed on Dec. 10, 2015.

(51) Int. Cl.
| | |
|---|---|
| *G06F 21/53* | (2013.01) |
| *G06F 16/22* | (2019.01) |
| *G06F 16/23* | (2019.01) |
| *G06F 21/55* | (2013.01) |

(52) U.S. Cl.
CPC .......... *G06F 21/53* (2013.01); *G06F 16/2246* (2019.01); *G06F 16/2358* (2019.01); *G06F 21/552* (2013.01)

(58) Field of Classification Search
CPC .. G06F 21/53; G06F 21/552; G06F 17/30327; G06F 17/30368
USPC .......................................................... 726/23
See application file for complete search history.

(56) References Cited

U.S. PATENT DOCUMENTS

| | | | | |
|---|---|---|---|---|
| 5,983,224 | A | * | 11/1999 | Singh ................... G06K 9/6223 |
| 6,289,354 | B1 | * | 9/2001 | Aggarwal ......... G06F 17/30327 |
| 6,401,043 | B1 | | 6/2002 | Stanton, Jr. et al. |
| 7,870,612 | B2 | * | 1/2011 | Liu ....................... G06F 21/562 |
| | | | | 713/188 |
| 2014/0237590 | A1 | * | 8/2014 | Shua ..................... G06F 21/566 |
| | | | | 726/22 |
| 2016/0077947 | A1 | * | 3/2016 | Basu ................... G06F 11/3476 |
| | | | | 714/45 |

OTHER PUBLICATIONS

Wagner et al., The String-to-String Correction Problem, Journal of the Association for Computing Machinery, Jan. 1974, pp. 168-173, vol. 21.
Bertsekas et al., Network Optimization: Continuous and Discrete Models, 1998, 585 pages, Athena Scientific, Belmont, Massachusetts, United States of America.

* cited by examiner

*Primary Examiner* — Dant B Shaifer Harriman
(74) *Attorney, Agent, or Firm* — Husch Blackwell LLP (57) ABSTRACT

Systems and methods index and search log files created after execution of binaries. A plurality of log files each have one or more sequences. An index tree is created for the log files. A first log file is placed into a bucket of the index tree according to the lengths of the one or more sequences of the first log file. Remaining logs files are placed the index tree according to their respective sequence lengths. Each log becomes a representative in the bucket or associated with a representative in the bucket. The index tree can be searched, where an incurred distance and a remaining distance is maintained during the search. Nodes are pruned based, at least in part, on the incurred distance and the remaining distance.

21 Claims, 7 Drawing Sheets

LOG 1 ~302

| ProcessId | ThreadId | FunctionCall | Arguments |
|---|---|---|---|
| 1 | 1 | SysCall_07 | C:\Documents\foo\patent_app.doc |
| 1 | 1 | SysCall_06 | Buffer=... target=... |
| 1 | 2 | SysCall_04 | Name=... path=... |
| 1 | 1 | SysCall_08 | Name=... |
| 1 | 2 | SysCall_05 | Name=... |

HISTOGRAM OF LOG 1 ~304

SysCall_07  1
SysCall_06  1
SysCall_04  1
SysCall_08  1
SysCall_05  1

LOG 2 ~312

| ProcessId | ThreadId | FunctionCall | Arguments |
|---|---|---|---|
| 1 | 2 | SysCall_07 | C:\Documents\foo\app2.doc |
| 1 | 1 | SysCall_04 | Name=... path=... |
| 3 | 1 | SysCall_07 | C:\Documents\foo\patent_app.doc |
| 1 | 1 | SysCall_06 | Buffer=... target=... |
| 1 | 2 | SysCall_05 | Name=... |
| 3 | 1 | SysCall_06 | Buffer=... target=... |
| 3 | 1 | SysCall_08 | Name=... |

HISTOGRAM OF LOG 2 ~314

SysCall_07  2
SysCall_06  2
SysCall_04  1
SysCall_08  2
SysCall_05  1

DISTANCE AND METHOD OF INDEXING SANDBOX LOGS FOR MAPPING PROGRAM BEHAVIOR

CROSS-REFERENCE TO RELATED APPLICATIONS

This Application claims priority to U.S. Provisional Patent Application Ser. No. 62/265,790, filed on Dec. 10, 2015, to Martin Vejmelka, entitled "Distance and Method of Indexing Sandbox Logs for Mapping Program Behavior," the entire disclosure of which is incorporated herein by reference.

FIELD

The disclosure relates generally to indexing files, and more particularly, to indexing sandbox logs using a distance function that measures dissimilarity of two logs.

BACKGROUND OF THE INVENTION

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed.

In the face of the growing threat of malware, many anti-malware software packages were developed to detect malware in a user's files. In order to detect malware in program files, it can be useful to run the program and determine the program's behavior. However, the number of program files that can be candidates for analysis can be in the millions or tens of millions of files. Analyzing such a large number of files using conventional methods can be impractical given the resources and time required to undertake such an analysis.

SUMMARY OF THE INVENTION

Systems and computer-implemented methods for indexing log files enable (i) receiving a plurality of log files, each of the log files having one or more sequences, (ii) creating an index tree, wherein a first log file of the plurality of logs is placed in the index tree according to the lengths of the one or more sequences of the first log file into a bucket, (iii) adding remaining logs of the plurality of log files to the index tree, wherein each of the remaining logs are placed into buckets according to their respective sequence lengths, wherein each log becomes a representative in the bucket or associated with a representative in the bucket, and (iv) searching the index tree, wherein searching of the index tree includes maintaining an incurred distance and a remaining distance and pruning nodes based, at least in part, on the incurred distance and the remaining distance.

BRIEF DESCRIPTION OF THE DRAWINGS

For a better understanding of the inventive subject matter, reference may be made to the accompanying drawings in which.

DETAILED DESCRIPTION OF THE INVENTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
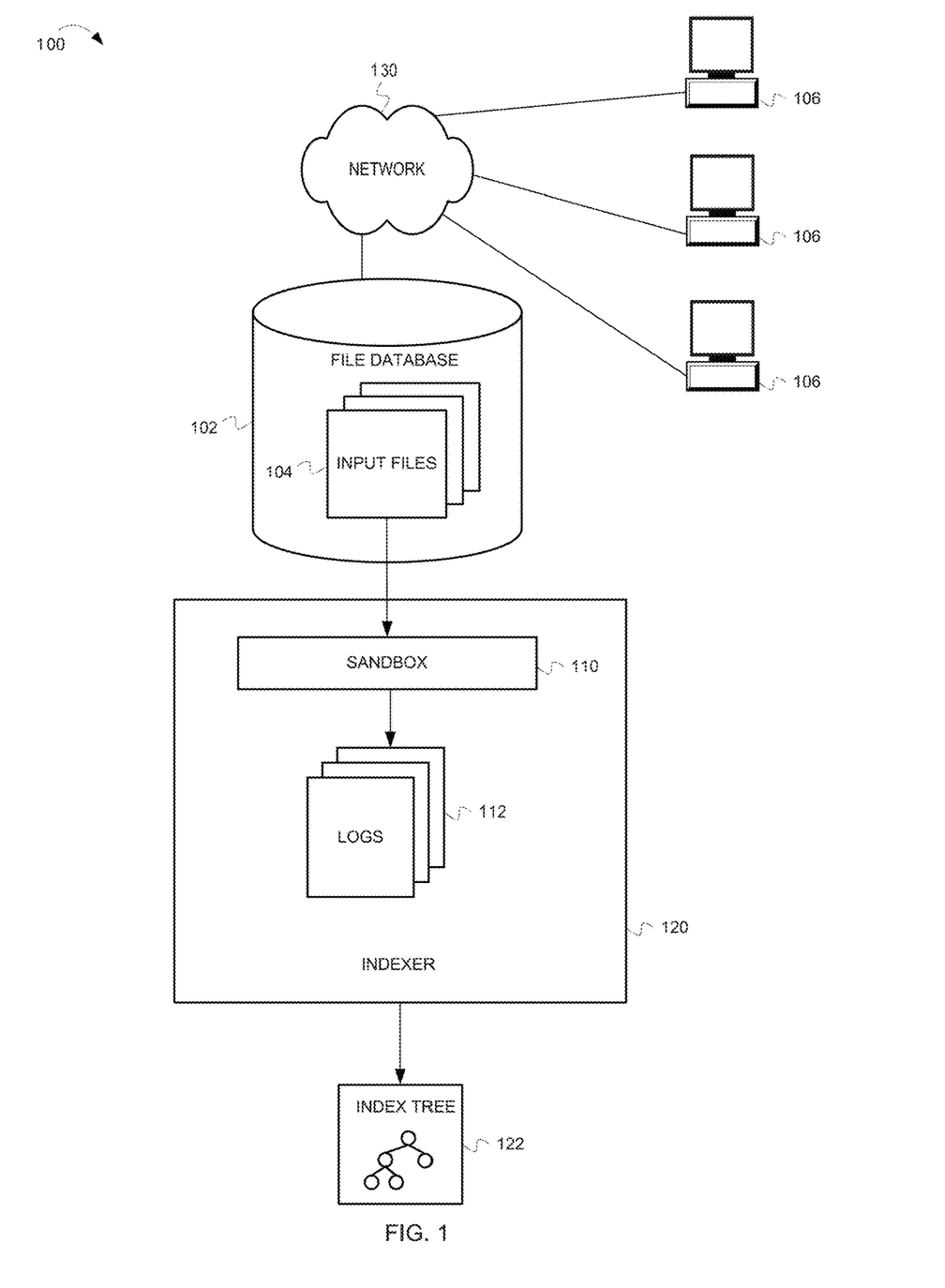
FIG. 1 is a block diagram of illustrating components of an operating environment of a system for indexing sandbox logs of executed files.

FIG. 1 is a block diagram of illustrating components of a system 100 for indexing sandbox logs of executed files. In some embodiments, system 100 includes an indexer 120 that analyzes input files 104 and produces an index tree 122 that has nodes used to index the input files 104 according to characteristics of the input files. Input files 104 can comprise executable files that can be maintained in a file database 102. In some aspects, the input files 104 can be files that have been previously submitted by client computers 106. For example, the input files 104 may have been previously submitted by anti-malware software running on client computers 106 via network 130. In alternative aspects, the input files 104 may have been collected from software download sites on the Internet. The inventive subject matter is not limited to any particular source for input files 104. Network 130 can be the Internet, an intranet, a local area network, or any other type of communications network.

Indexer 120 receives some or all of the input files 104 and executes each of the input files in sandbox 110. Sandbox 110 is an execution environment that isolates the running code in an input file from the operating system, network devices, and storage devices of the indexer 120 system so that if the input file contains malware, the malware does not affect (i.e., infect) the indexer 120 system. For example, sandbox 110 may be a virtual machine that provides a virtual operating system, virtual storage, and virtual network devices for access by the executable code in the input file. In some aspects, the sandbox 110 can run on a client machine (e.g., client 106) and the resulting logs can be submitted to the indexer via a network 130.

In some aspects, sandbox 110 produces a log 112 when an input file is executed within sandbox 110. The sandbox 110 can be a kernel driver that can be positioned between an application and the operating system. The sandbox 110 can intercept system calls and store information about the system calls in log 112. The log 112 may include data indicating the operating system calls and call parameters invoked by the executable file when running in sandbox 110. For example, the log file may contain text strings identifying the name of the system call and the type or class of the arguments to the system call. Argument values may also be stored in the log file and used for later analysis. Further, the log file can contain information about the environment (e.g., operating system version and type, language settings, standard paths, username etc.) that can be used to normalize data in the log. As an example, file path names can be normalized in a manner that can be useful in linking across computers. For instance, the path "C:\Documents\UserName can be normalized to "C:\Documents\% USER %".

The log 112 is saved and can be used by indexer 120 to map the behavior of the executable input file. For example, indexer 120 can analyze the logs produced by executing the input files to determine input files that have similar behaviors based on their respective log files. For example, a particular type of malware may exhibit a particular pattern of system calls and/or system call parameters. Executable files that produce a sandbox log 112 that have similar behavior (e.g., a similar pattern of system calls and system call parameters) can be mapped to the same index node in an index tree 122. Index tree 122 can be a tree in which each node of the tree is associated with a bucket of files, where the files in a bucket have similar behavior based on their respective sandbox logs.

Further details on the operation of indexer 120 and the structure of index tree 122 will now be provided with reference to FIGS. 2, 3, 4 and 5. In the discussion that follows, an upper case letter (e.g., "X") refers to a set of sequences of function calls, for example, a set of sequences in a log file. "$X_i$," is used to refer to the $i^{th}$ sequence in the set of sequences. A lower case letter may be used to refer to a symbol with a sequence, where a symbol is an individual function call in a sequence. For example, "x" may refer to a symbol in a sequence $X_j$. The $i^{th}$ symbol in a sequence $X_j$ may be referred to as "$x_i$". Thus in the example set "X" of two sequences: {("SysCall_01", "SysCall_02", "SysCall_03"), (SysCall_04, SysCall_05)}, the symbol $x_3$ of sequence $X_1$ is "SysCall_03" (e.g., the third symbol of the first sequence in the set).

Figure 2:
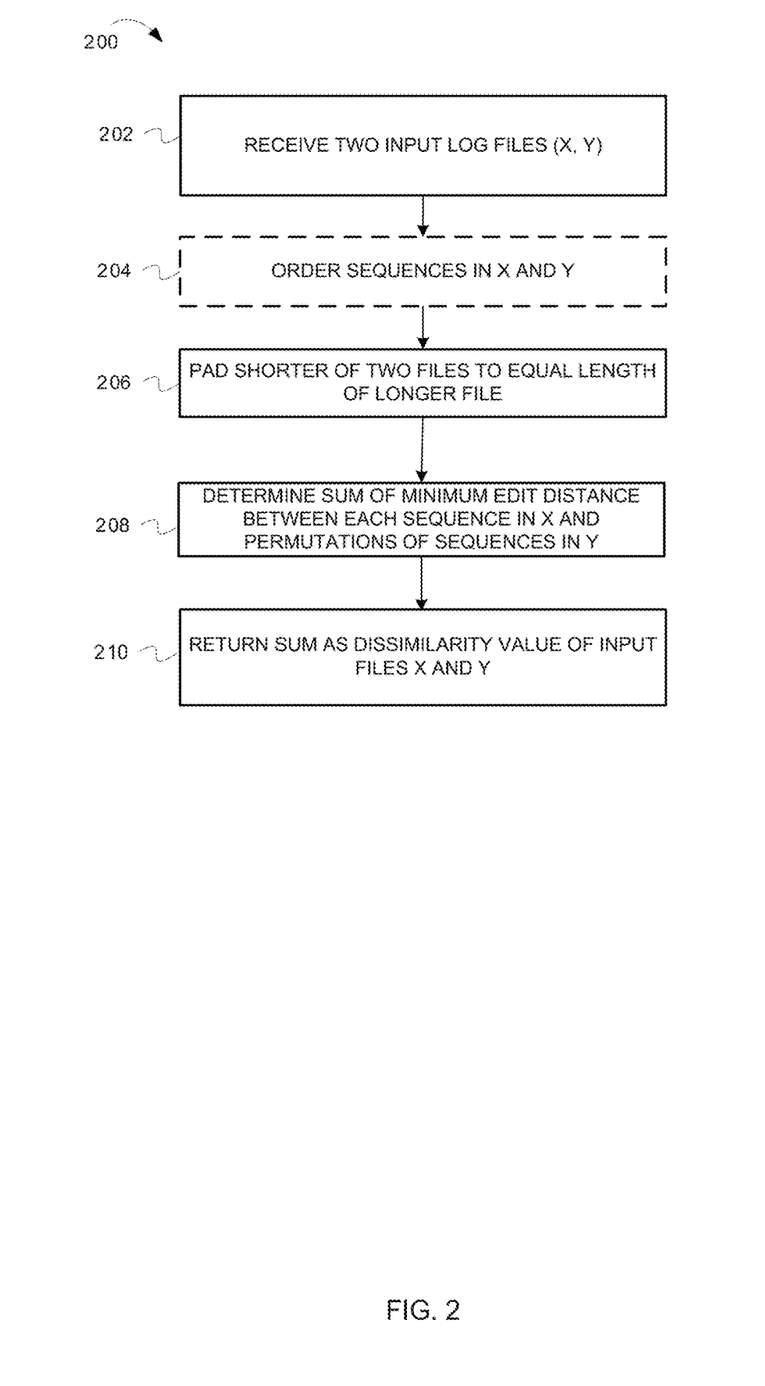
FIG. 2 is a flow chart illustrating operations of a method for determining a dissimilarity between two sandbox log files.

FIG. 2 is a flow chart illustrating operations of a method 200 for determining a dissimilarity value that represents a degree of dissimilarity between two sandbox log files. At block 204, two inputs (X and Y) are received. The inputs can be a set of sequences in (or extracted from) a sandbox log file. As noted above, the sequences may identify system function calls. Further, the sequences may include information identifying classes or types of arguments to the system calls. In some aspects, the sequences correspond to system function calls performed by the processes and threads of an application, where an individual sequence corresponds to the system function calls performed by a unique process/thread combination.

At block 204, the sequences in the files are ordered. In some embodiments, the ordering operation is not necessary, as the order of sequences is taken to be the order that the sequences appear in the respective log files. For example, the ordering in the log file may represent the order that the system functions were called. Alternatively, the sequences may be ordered by length, alphabetically, or some other ordering. The inventive subject matter is not limited to any particular ordering.

At block 206, the input file that has a lesser number of sequences is padded with empty sequences so that the two input files have the same number of sequences. For example, if logfile X has m sequences, and log file Y has p sequences, and m is not equal to p, then |p−m| empty sequences are added to the log file having fewer sequences so that both input files X and Y have k=max(m, p) sequences.

At block 208, the sum of the minimum edit distance between each sequence in input file X and the permutations of sequences in input file Y is determined. Formula 1 below illustrates the calculation of the dissimilarity function "d" on input files X and Y:

$$d(X, Y) = \min_J \sum_{i=1}^{k} l(X_i, Y_{J_i}) \qquad (1)$$

where J is a permutation of sequences in Y=($j_1, j_2, \ldots, j_n$), $X_i$ is the $i^{th}$ sequence in input file X, $Y_{J_i}$ is the $i^{th}$ sequence in one of a permutation of the sequences in input file Y, and function "l" is an "edit distance" function. The edit distance function returns a value that represents the dissimilarity of two sequences. For example, the value may represent the minimum number of operations (insertions, deletions, transformations etc.) needed to transform one sequence into another sequence. Different operations may have a different cost or weight. For example, insertions and deletions may have the same cost or weight, while substitutions may have a different cost or weight. In some embodiments, the Levenshtein distance is used. Details on the Levenshtein distance can be found in Vladimir I. Levenshtein, "Binary Codes Capable of Correcting Deletions, Insertions, and Reversals." *Soviet Physics Doklady* 10 (8) (February 1966): 707-710, which is hereby incorporated by reference herein. Other edit distance functions can be used and are within the scope of the inventive subject matter. The edit distance function may be weighted according to domain knowledge of the input file space. For example, a weighting that is used when both input symbols are system calls that involve the file system may be lower than a weighting that is used when a symbol representing a registry function is compared to a symbol representing a file system call.

The summation in formula 1 above thus determines the edit distance from a pairwise computation of edit distances for each sequence in X with each corresponding sequence in Y according to the permutation J. The minimum of the sum of the edit distances over all permutations J is then used as the result of the dissimilarity function for the two inputs X and Y, and the sum is returned to the caller at block 210. In some aspects, an efficient polynomial time algorithm can be used to compute this minimum, e.g. the Hungarian algorithm in Harold W. Kuhn, "The Hungarian Method for the assignment problem." *Naval Research Logistics Quarterly* 2 (1955): 83-97.

The above-described method provides a novel way to determine dissimilarity (or conversely, similarity) between two sets of sequences (e.g., sequences in a sandbox log file). However, even using various optimizations, the application of the method to a large number of input files may be prohibitively expensive in terms of computing resources and time. In some embodiments, lower bounds can be used to quickly discard candidates that are outside of a given search radius, thus can accelerate the discovery of near neighbors.

In some embodiments, a first lower bound function "$l_1$" can be based on the differences of sequence lengths of the two sequences. In such embodiments, when the sequences in the input X as well as in Y are sorted in non-increasing order by sequence length, the lower bound "$l_1$" can be computed as follows:

$$l_1(X,Y) = \Sigma_{i=1}^{k} ||X_i| - |Y_i||, \quad (2)$$

where $|X_i|$, $|Y_{J_i}|$ are the lengths of the respective sequences. In some embodiments, the computational complexity can be reduced by pre-sorting the logs when the logs are initially loaded into the system.

In alternative embodiments, a second lower bound function "$l_2$" can be determined using a histogram of function calls. First, the sum of the lengths of all sequences in X is computed:

$$t(X) = \Sigma_{i=1}^{k} |X_i| \quad (3)$$

Thus, t(X) is the total log length of X. A function $r_X(s)$ is defined that returns the number of occurrences of the symbol s in the log file X. A variable L is defined such that:

$$L = |t(X) - t(Y)| \quad (4)$$

and a variable D is defined such that:

$$D = \Sigma_s |r_X(s) - r_Y(s)|, \quad (5)$$

Where s iterates over all possible symbols (function calls). The lower bound function $l_2$ can then be defined as:

$$l_2(X,Y) = L + \frac{D-L}{2} s_{min} \quad (6)$$

where $s_{min}$ is the minimum substitution cost of associated with the symbol s. The minimum substitution cost can be a value in the range of [0,1]. In some embodiments, the computation complexity can be reduced by precomputing t(X) when a log is initially loaded into the system. Note that in alternative aspects, the substitution cost may be eliminated from equation 6 by assuming that all costs (insertion, deletion, and substitution) are one (1) in the formulas above.

In further alternative embodiments, a third lower bound function "$l_3$" can be determined based on the difference of total log lengths. In such embodiments:

$$l_3(X,Y) = |t(X) - t(Y)| \quad (7)$$

where t(X) is the total length of sequences in the log file (see equation 3 above).

Figure 3:
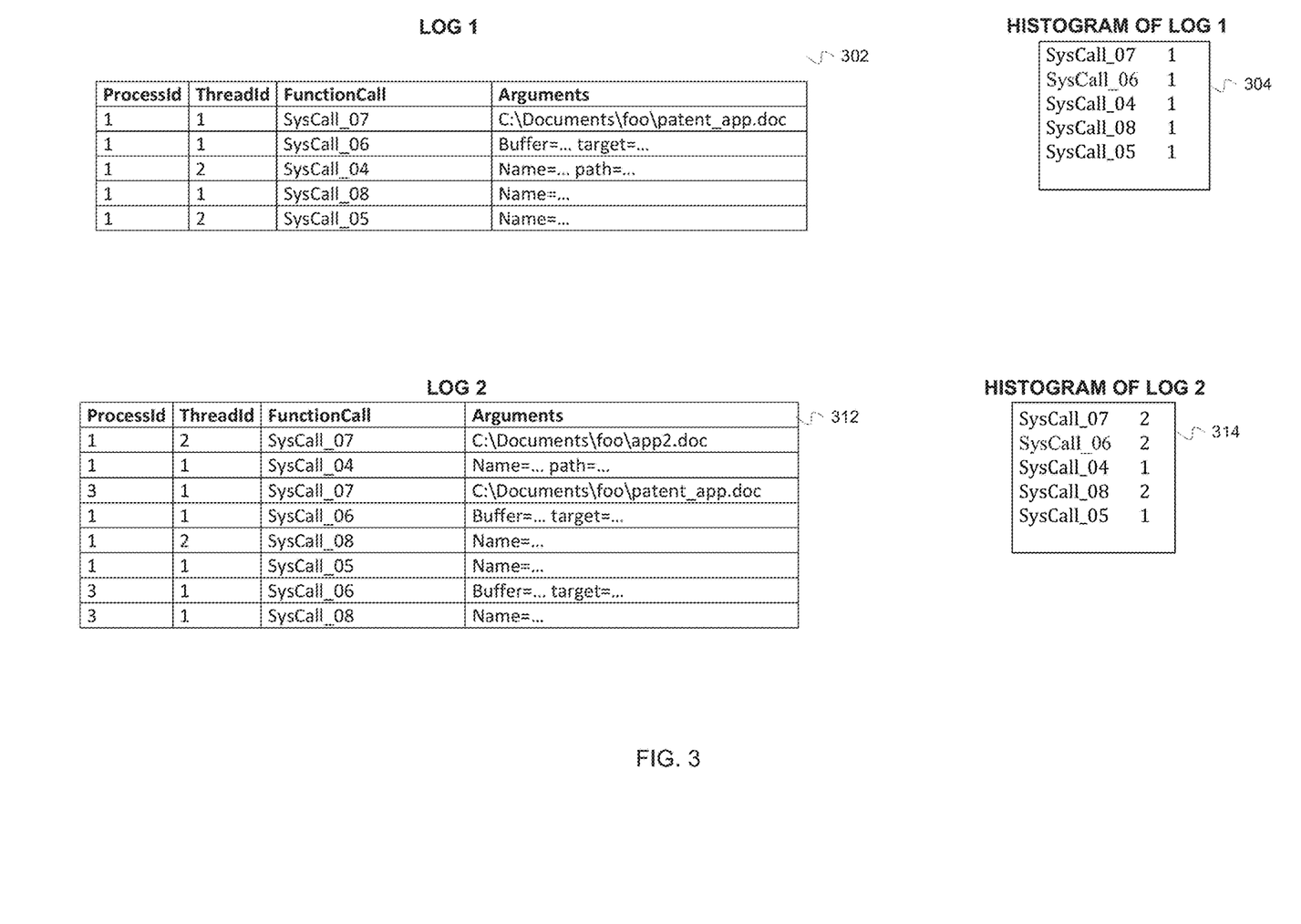
FIG. 3 illustrates two example log files and associated histograms that are used to present provide an example of the operation of the method illustrated in FIG. 2.

FIG. 3 illustrates two example log files (302, 312) and associated histograms (304, 314) that are used to present provide an example of the operation of the method illustrated in FIG. 2. The two example logs (302, 312) are simplified sandbox logs that are used to provide an example of how the distance is computed between logs in some embodiments. Further, the discussion below will provide an example of how the lower bounds work in some embodiments.

As noted above, the method extracts the sequences of function calls in each unique process/thread combination into a log. The log file 302 includes two sequences: {(SysCall_07, SysCall_06, SysCall_08), (SysCall_04, SysCall_05)}. The log file 312 includes three sequences: {(SysCall_07, SysCall_08), (SysCall_04, SysCall_06, SysCall_05), (SysCall_07, SysCall_06, SysCall_08)}.

Computing the Distance Between Two Sequences

One aspect in some embodiments is that the method operates under the assumption that it can't a-priori match sequences together. This is because process thread identifiers are arbitrary and will vary from execution to execution. Thus, in some aspects, the method looks for a matching of sequences between the logs so that the sum of the Levenshtein distance between matched pairs is as small as possible.

The first log is extended with an empty sequence: {(SysCall_07, SysCall_06, SysCall_08), (SysCall_04, SysCall_05), ( )}. This allows reference to the first, second and third sequence of each log.

The first log/first sequence matches exactly second log/third sequence, and thus match with an edit distance=0. Then the second sequence in the first log is missing the symbol "SysCall_06" but otherwise it matches the second sequence in the second log. Thus, the edit distance=1, (i.e., one insert operation). The first sequence of the first log is matched with the empty sequence (edit distance=2, two insert operations). The total distance is then 3. Note that the actual name of the system function, e.g., "SysCall_07," has nothing to do with the distance. Each function is simply a different symbol in the sequence.

In the above simplified example, computing the edit distance can be completed relatively quickly. However, if there are many sequences in each log and they are long, computing this distance can consume an inordinate amount of computing resources. Thus, lower bounds can be used to make the computation of distances more efficient.

Lower Bound $l_1$

As discussed above, the sequences in logs can be sorted by length in some embodiments. For the example log files 302 and 312 of FIG. 3, the first log is unmodified and second log becomes: {(SysCall_04, SysCall_06, SysCall_05), (SysCall_07, SysCall_06, SysCall_08), (SysCall_07, SysCall_08)}. After sorting, the absolute length differences can be summed to obtain a lower bound on the distance. The first log has sequence lengths of {3, 2, 0} (the 0 length sequence for the extension by empty sequence). The second log has sequence lengths of {3,3,2}. Thus the lower bound on the distance (referred to as $l_1$) is |3−3|+|2−3|+|0−2|=3. This value is a lower bound since the computed value is never larger than the actual distance.

The advantage of pre-sorting the logs by length of sequence performed in some embodiments is demonstrated above. If the logs are pre-sorted logs, it can be more efficient to sum up the differences between the lengths of the sorted sequences to obtain lower bound.

Lower Bound $l_2$

The histogram based lower bound completely disregards which functions are in which sequences. In the example illustrated in FIG. 3, histogram 304 is associated with log file 302, and histogram 314 is associated with log file 312. A condition for the two logs to have a distance of zero is that the histograms match. In some embodiments, the absolute differences in the number of function calls of each function are added. In this example, D=1+1+0+1+0=3. Using formula (7) above with L=3 (difference of total lengths) to obtain L+½*(D−L)=3. In this example, it is assumed that the substitution cost $s_{min}$ is one.

Lower Bound $L_3$

For the example above, the calculation of $L_3$ is relatively straightforward. The total length of the first log is 5 and the total length of the second log is 8, thus the difference is 3, which is $L_3$. Note that in this case, all lower bounds return the value 3 while the distance is also 3. In general it can only be guaranteed that $l_3$ is not greater than $l_2$ or $l_1$ and all three are not greater than the distance.

Figure 4:
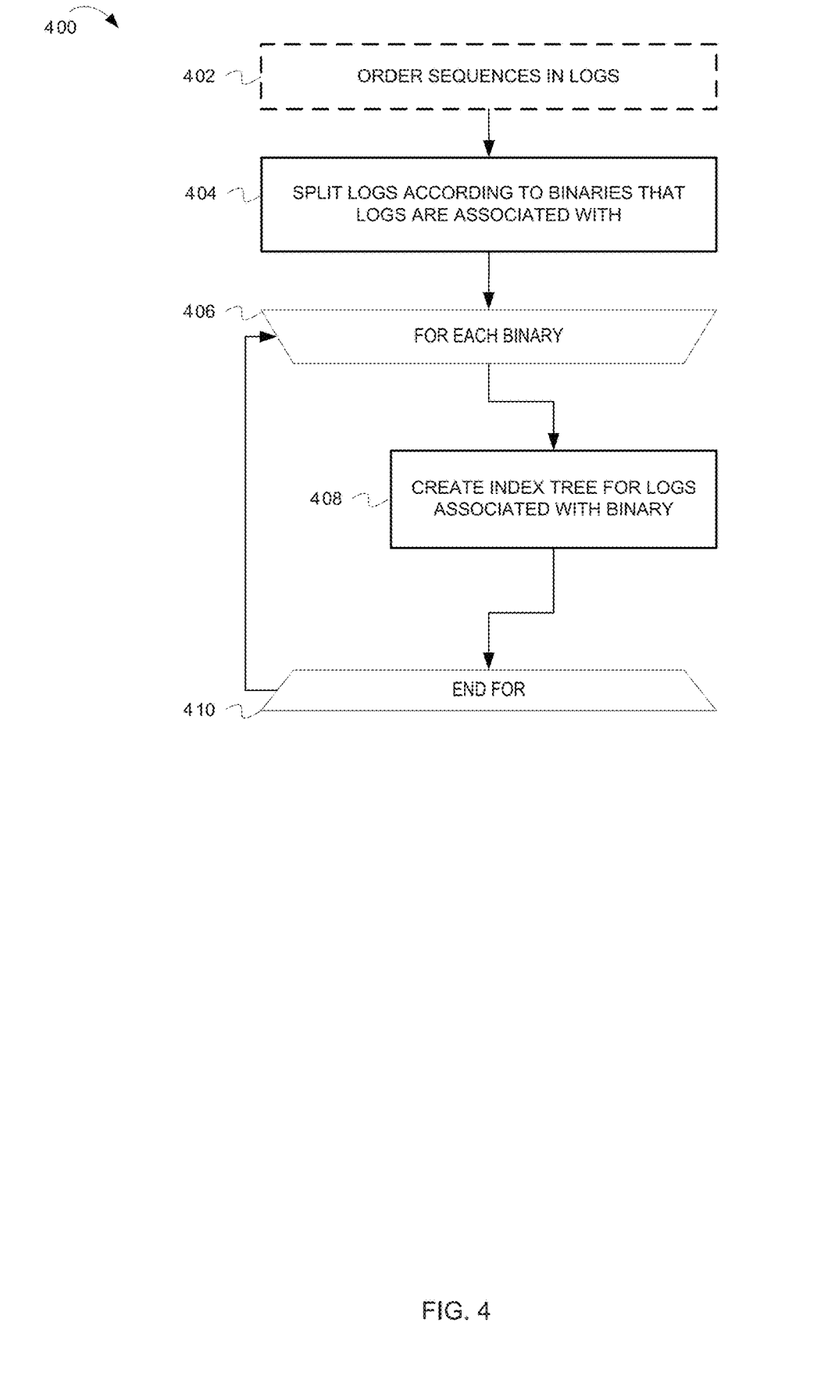
FIG. 4 is a flow chart illustrating operations of a method for creating an index tree for sandbox log files.

FIG. 4 is a flow chart 400 illustrating operations of a method for creating an index tree of sandbox log files. At block 402, the log files used to create the tree are ordered in non-increasing order based on the length of sequences in the log file. It should be noted that if the files have already been ordered, for example, when the log file was loaded onto the system, then the operations at this block may be omitted.

At block 404, in some embodiments, the indexer can split the log files into groups according to the binary executable file to which the log belongs. The indexer may start with binaries having the most log files. Splitting the binaries into groups can be desirable, because logs belonging to a single binary can have a higher probability of being similar or the same when compared to logs from different binaries.

Block 406 is the beginning of a loop that processes each group of log files associated with a particular binary.

At block 408, an index tree is created by recursively partitioning the logs into subtrees according to the length of the longest sequence, followed by the length of the second longest sequence and so forth. This processing assumes that the ordering indicated at block 402 has taken place, either when the indexer begins to process the log files, are at an earlier point in time, for example, when the log files were loaded onto the system.

After an index tree is created from the logs associated with a particular binary, the at block 410, if unprocessed log files remain, the method returns to block 406 to get the next group of log files associated with the next binary to be processed.

Figure 5:
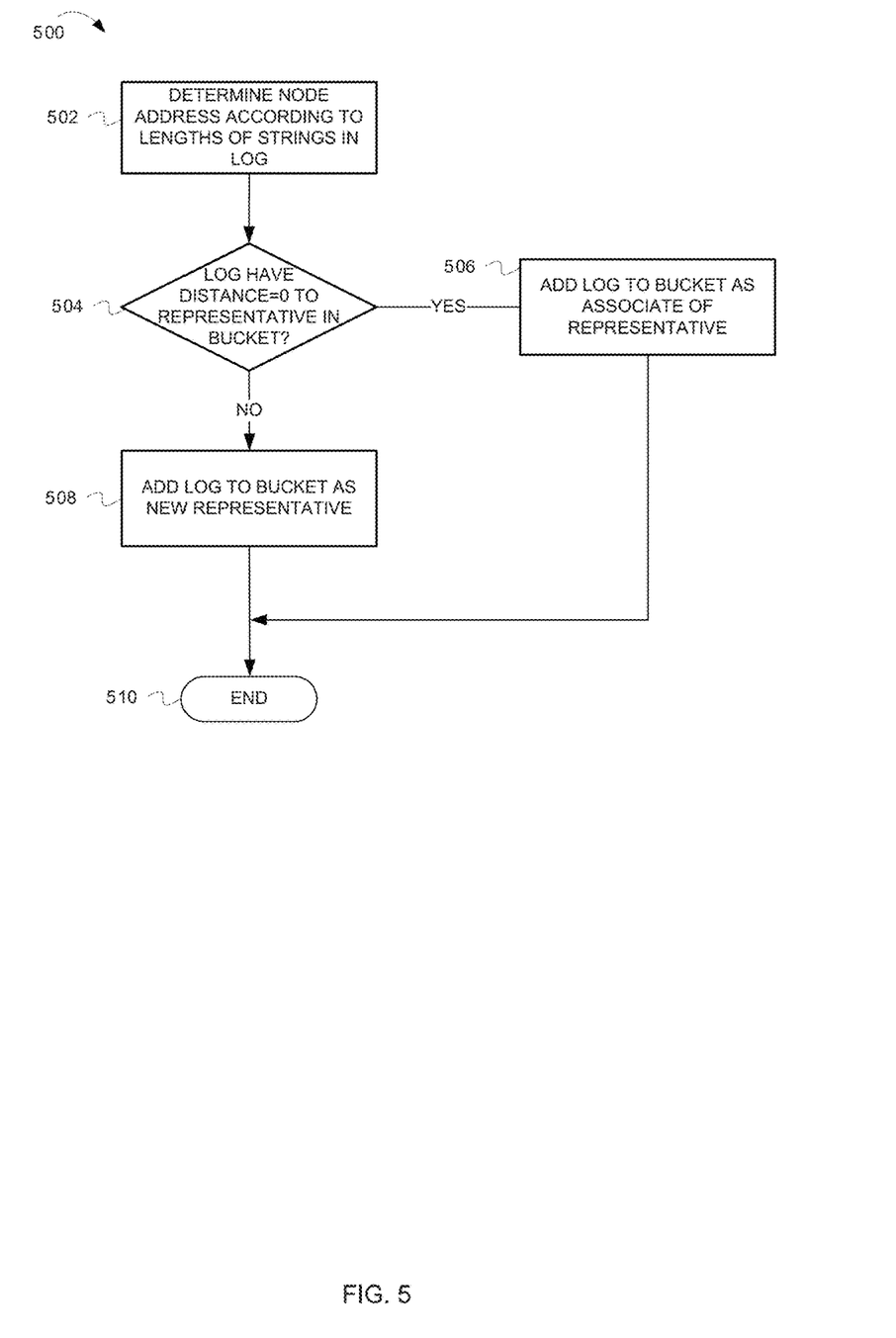
FIG. 5 is a flow chart illustrating a method for inserting a log file into an index tree.

FIG. 5 is a flow chart 500 illustrating operations of a method for inserting a log into an index tree of sandbox log files. At block 502, a node in the tree is identified for the log based on the ordered sequence lengths in the file. The log file will be placed into a structured "bucket" of log files that can comprise representative log files and associated log files.

At block 504, the indexer determines if the log file to be inserted has a distance of zero from any current representative log files in the bucket. If so, then at block 506, the indexer adds the log file to be inserted as an associated log of the representative log file in the bucket.

If the check at block 504 determines that there are no representative log files that have a distance of zero from the log file to be inserted, then at block 508, the indexer adds the log file to be inserted as a new representative log file in the bucket.

The method described in FIG. 5 has the effect of constructing equivalence classes of logs (i.e., logs that all have a distance of zero from one another). Retrieval of a log can be faster because only one log file, the representative for the equivalence class, is checked. The associated log files of the representative will have the same distances as the representative log file and thus need not be checked. As a result, only one representative of each equivalence class need be checked.

In some embodiments, separate index trees can be built for each binary executable. The indexer can then merge the separate index trees created for the logs for each binary executable into a single index tree covering all of the processed log files. During the merging process, each representative node in the merged tree is matched against representatives in the original tree, if a representative node matches, it and its associated logs are all added to the representative node in the original tree. If no match is found, the representative is added into the bucket together with its associated logs.

Figure 6:
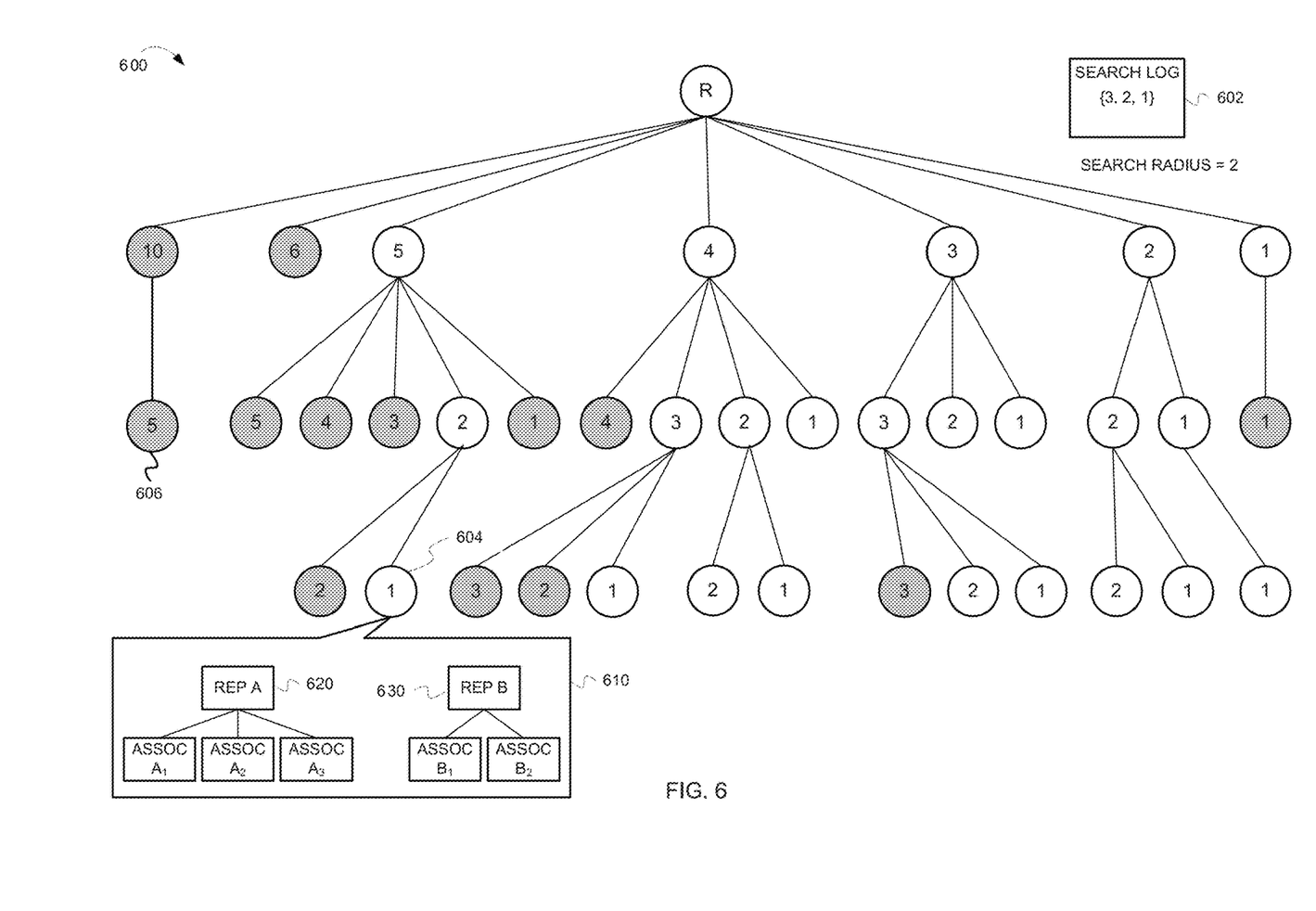
FIG. 6 is an example index tree used to illustrate the operation of the systems and methods described in FIGS. 1-3.

FIG. 6 is an example index tree 600 used to illustrate searching an index tree to obtain log files that are within a predetermined or configurable threshold distance (i.e., search radius). Each node in the index tree 600 is labeled using the ordered sequence lengths of the log files in the bucket associated with the node. For example, the bucket at node 604 contains log files having three sequences, where the three sequences have a length of 5, 2 and 1.

In some embodiments, an algorithm to search the index tree can attempt to prune nodes with buckets containing possible hits using various strategies.

In a first strategy, the search algorithm, when descending through the tree, keeps track of the length mismatches at each level in the tree and reduces the search radius according to the length differences already encountered. For example, assume that a log file (e.g., log file 602) has sequences of length 3, 2, 1 and that the search radius 2, then at first level, the search algorithm descends into the children of length 1 to 5 (3±2). However, when the search algorithm descends into the branch 1 and 5, the length difference has already accounted for the radius two, so the effective search radius is reduced to zero for lower level branches. Similarly, in branches 2 and 4, the search algorithm reduces the search radius by 1. This strategy prunes nodes with log shapes which do not match the search log shape closely enough. Nodes that have been pruned using this strategy are illustrated in gray.

In a second strategy, the search algorithm keeps track of the remaining length of the search log. The remaining length is the sum of the lengths of the sequences that have not been used in the search yet. This is a lower bound on the distance between the search log and the logs in the bucket under consideration. For example, the search log has sequences of lengths 10,5,5,1 and assuming the current search position is at the tree location 10,5 (e.g., node 606 in tree 600) then the remaining length is 6 (5+1). The bucket at node 606 contains only logs with two sequences, a first sequence of length 10 and a second sequence of length 5. Thus the lower bound of the length from the search log to all logs in bucket at node 606 is 6 (the remaining length). If the search radius is less than 6, then the bucket can be safely skipped. This strategy skips tends to prune buckets early in the recursive search.

In a third strategy, the bucket is structured into equivalence classes and from each equivalence class, only a single representative needs to be checked. This is because all of the equivalent log files (i.e., the associated log files to the representative) have a distance from zero from the representative log file. Thus, equivalent logs are accepted or rejected at the same time.

In a fourth strategy, the search algorithm can first check the lower bound based on the histogram, which prunes candidates with similar shapes but different function calls before computing the real distance function, which is computationally intensive.

The above-described systems and methods may be utilized in various applications. Some non-limiting examples of such examples will now be presented.

Virus Families

It is possible to track virus families across re-encryptions of the executable code. If highly similar or the same behavior is seen for two different malware executables, it may be inferred that both belong to a single virus family.

Discrete Modes of Behavior

In cases, where all logs collected from a certain program form only a few equivalence classes, the visible activity of the program can be summarized using a few "prototype" logs, one per equivalence class, instead of examining all the original logs. The above-described systems and methods may be useful in understanding program behavior with less effort. A number of examples have been found with hundreds or thousands of logs which are captured well by only a few "prototype" logs.

Variability of Arguments

The construction of equivalence classes enables can be used to map function arguments one-to-one between among all logs in the equivalence class. For example, it may make sense to identify the path argument of the second file creation call in the first thread. All such paths in the grouping can be examined and the intrinsic variability of the paths can be made apparent. Also, summarized arguments can be used in the "prototype" logs for increased clarity.

It should be noted that while the above-described systems and methods have been described in the context of sets of sequences in log files produced by executing binaries in a sandbox environment, the inventive subject matter is not limited to such environments. The above-described systems and methods may be applied to any environment that processes sets of sequences to determine the similarity/dissimilarity of the sets of sequences.

Figure 7:
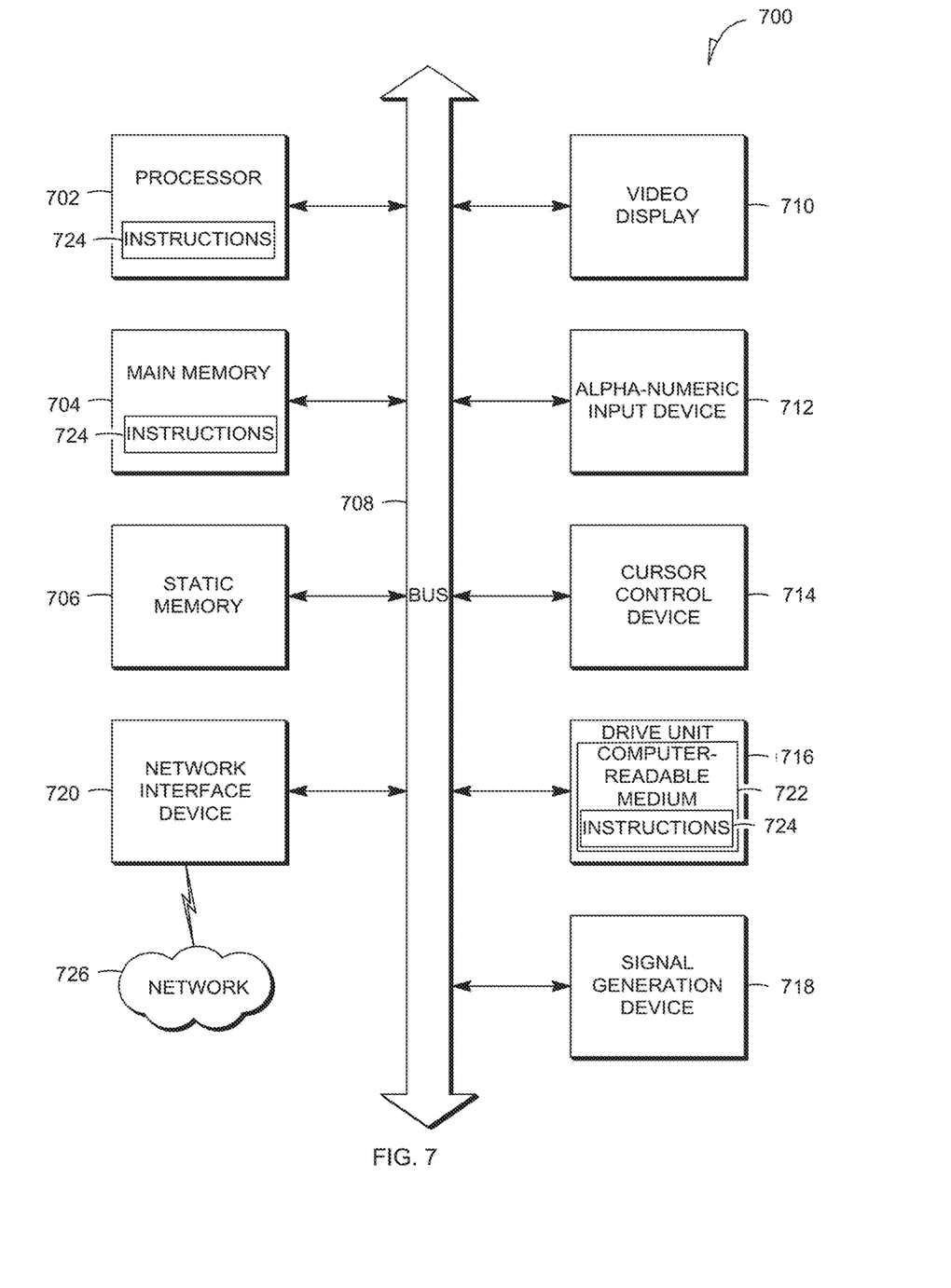
FIG. 7 is a block diagram of an example embodiment of a computer system upon which embodiments of the inventive subject matter can execute.

FIG. 7 is a block diagram of an example embodiment of a computer system 700 upon which embodiments of the inventive subject matter can execute. The description of FIG. 7 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 7 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a signal transmission medium via the network interface device 720 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for indexing log files, the method comprising:
   receiving, by a computer system, a plurality of log files, each of the log files produced from execution of an input executable file within a sandbox, and each of the log files having one or more sequences identifying one or more system call behaviors of the input executable file from which the log file is produced;
   creating, by the computer system, an index tree having one or more nodes, wherein a first log file of the plurality of log files is placed in the index tree according to the lengths of the one or more sequences of the first log file into a bucket;
   adding, by the computer system, remaining log files of the plurality of log files to the index tree, wherein each of the remaining log files are placed into buckets according to their respective sequence lengths, wherein each log file becomes a representative in the bucket or associated with a representative in the bucket, wherein each node of the index tree is associated with one of the buckets, and wherein the log files in each bucket have sequences identifying similar input executable file system call behaviors; and
   searching, by the computer system, the index tree, said searching including maintaining an incurred distance and a remaining distance and pruning nodes based, at least in part, on the incurred distance and the remaining distance.

2. The method of claim 1, further comprising determining, by the computer system, the sum of one or more distance values between the one or more sequences in the first log file and one or more sequences of a second log file.

3. The method of claim 2, wherein determining the sum of the one or more distance values comprises determining an edit distance between the one or more sequences in the first log file and the one or more sequences in the second log file.

4. The method of claim 2, wherein determining the sum of one or more distance values between the one or more sequences in the first log file and the one or more sequences in the second log file comprises:
   determining minimum of the sum of the edit distance values between each of the one or more sequences in the first log file and permutations of the one or more sequences in the second log file over one or more permutations.

5. The method of claim 1, further comprising computing, by the computer system, a distance between two log files, wherein said computing a distance comprises determining a computationally efficient lower bounds, wherein the lower bounds are used to index candidates in the index tree and to reduce the number of evaluations of the distance function.

6. The method of claim 1, wherein said method comprises a method for determining the behavior of an executable computer program associated with the received log files.

7. The method of claim 1, wherein said method comprises a method for detecting malware in an executable computer program associated with the received log files.

8. A system for indexing log files, the system comprising:
   at least one processor; and
   at least one computer-readable storage device connected to the at least one processor, wherein said at least one computer-readable storage device stores one or more processor-executable instructions that, when executed by the at least one processor:
(i) receives a plurality of log files, each of the log files produced from execution of an input executable the within a sandbox, and each of the log files having one or more sequences identifying one or more system call behaviors of the input executable the from which the log the is produced;
(ii) creates an index tree having one or more nodes, wherein a first log the of the plurality of log files is placed in the index tree according to the lengths of the one or more sequences of the first log file into a bucket;
(iii) adds remaining log files of the plurality of log files to the index tree, wherein each of the remaining log files are placed into buckets according to theft respective sequence lengths, wherein each log the becomes a representative in the bucket or associated with a representative in the bucket, wherein each node of the index tree is associated with one of the buckets, and wherein the log files in each bucket have sequences identifying similar input executable the system call behaviors; and
(iv) searches the index tree, said searching including maintaining an incurred distance and a remaining distance and pruning nodes based, at least in part, on the incurred distance and the remaining distance.

9. The system of claim 8, wherein said system further determines the sum of one or more distance values between the one or more sequences in the first log file and one or more sequences of a second log file.

10. The system of claim 9, wherein said determining the sum by said system of the one or more distance values comprises determining an edit distance between the one or more sequences in the first log file and the one or more sequences in the second log file.

11. The system of claim 9, wherein determining the sum by said system of one or more distance values between the one or more sequences in the first log file and the one or more sequences in the second log file comprises:
determining minimum of the sum of the edit distance values between each of the one or more sequences in the first log file and permutations of the one or more sequences in the second log file over one or more permutations.

12. The system of claim 8, wherein said system computes a distance between two log files, wherein said computing a distance between two log files comprises determining a computationally efficient lower bounds, wherein the lower bounds are used to index candidates in the index tree and to reduce the number of evaluations of the distance function.

13. The system of claim 8, wherein said system determines the behavior of an executable computer program associated with the received log files.

14. The system of claim 8, wherein said system comprises a system for detecting malware in an executable computer program associated with the received log files.

15. A non-transitory computer readable storage medium comprising a set of instructions executable by a computer for indexing log files, the non-transitory computer readable storage medium comprising:
instructions for receiving a plurality of log files, each of the log files produced from execution of an input executable file within a sandbox, and each of the log files having one or more sequences identifying one or more system call behaviors of the input executable file from which the log file is produced;
instructions for creating an index tree having one or more nodes, wherein a first log file of the plurality of log files is placed in the index tree according to the lengths of the one or more sequences of the first log file into a bucket;
instructions for adding remaining log files of the plurality of log files to the index tree, wherein each of the remaining log files are placed into buckets according to their respective sequence lengths, wherein each log file becomes a representative in the bucket or associated with a representative in the bucket, wherein each node of the index tree is associated with one of the buckets, and wherein the log files in each bucket have sequences identifying similar input executable file system call behaviors; and
instructions for searching the index tree, said searching including maintaining an incurred distance and a remaining distance and pruning nodes based, at least in part, on the incurred distance and the remaining distance.

16. The non-transitory computer readable storage medium of claim 15 further comprising a set of instructions for determining the sum of one or more distance values between the one or more sequences in the first log file and one or more sequences of a second log file.

17. The non-transitory computer readable storage medium of claim 16, wherein determining the sum of the one or more distance values comprises determining an edit distance between the one or more sequences in the first log file and the one or more sequences in the second log file.

18. The non-transitory computer readable storage medium of claim 16, wherein determining the sum of one or more distance values between the one or more sequences in the first log file and the one or more sequences in the second log file comprises:
determining minimum of the sum of the edit distance values between each of the one or more sequences in the first log file and permutations of the one or more sequences in the second log file over one or more permutations.

19. The non-transitory computer readable storage medium of claim 15, further comprising a set of instructions for computing a distance between two log files, wherein said computing a distance between two log files comprises determining a computationally efficient lower bounds, wherein the lower bounds are used to index candidates in the index tree and to reduce the number of evaluations of the distance function.

20. The non-transitory computer readable storage medium of claim 15, wherein said instructions comprises instructions for determining the behavior of an executable computer program associated with the received log files.

21. The non-transitory computer readable storage medium of claim 15, wherein said instructions comprise instructions for use in detecting malware in an executable computer program associated with the received log files.

* * * * *